(12) United States Patent
Lecomte et al.

(10) Patent No.: US 7,801,305 B2
(45) Date of Patent: *Sep. 21, 2010

(54) SECURE DEVICE FOR THE BROADCASTING, RECORDING AND VIEWING ON DEMAND OF AUDIOVISUAL WORKS IN A FORMAT OF THE MPEG-2 TS TYPE

(75) Inventors: Daniel Lecomte, Paris (FR); Sebastien Georges, Paris (FR)

(73) Assignee: Nagra France (FR)

( * ) Notice: Subject to any disclaimer, the term of this patent is extended or adjusted under 35 U.S.C. 154(b) by 1269 days.

This patent is subject to a terminal disclaimer.

(21) Appl. No.: 10/544,515

(22) PCT Filed: Feb. 5, 2004

(86) PCT No.: PCT/FR2004/050046

§ 371 (c)(1),
(2), (4) Date: Nov. 28, 2005

(87) PCT Pub. No.: WO2004/073292

PCT Pub. Date: Aug. 26, 2004

(65) Prior Publication Data

US 2006/0210075 A1    Sep. 21, 2006

(30) Foreign Application Priority Data

Feb. 7, 2003    (FR) .................................. 03 01494

(51) Int. Cl.
*H04N 7/167* (2006.01)
*H04L 9/00* (2006.01)
*H04K 1/00* (2006.01)

(52) U.S. Cl. .................. 380/217; 380/212; 726/26

(58) Field of Classification Search .................. None
See application file for complete search history.

(56) References Cited

U.S. PATENT DOCUMENTS 6,021,197 A * 2/2000 von Willich et al. ......... 380/212

(Continued)

FOREIGN PATENT DOCUMENTS

EP    0 920 209 A1    6/1999

(Continued)

OTHER PUBLICATIONS

Carsten Griwodz et al., *Protecting VoD the Easier Way*, ACM Multimedia '98, Bristol, UK, Sep. 12-16, 1998, pp. 21-28.

*Primary Examiner*—Christopher A Revak
(74) *Attorney, Agent, or Firm*—DLA Piper LLP (US)

(57) ABSTRACT

A process for distributing audiovisual sequences in accordance with a nominal stream format respecting a MPEG-2 TS norm including a succession of TS packets, including analyzing the stream made prior to transmitting to client equipment to generate a first stream in conformity with the MPEG-2 TS format, modifying all or part of the TS packets by substituting packets of the same structure, but whose content was modified, and generating a second stream of a format including digital information suitable for permitting reconstruction of the nominal stream, separately transmitting the two streams from a servers to the equipment, and a calculation is made on the equipment of a synthesis of a stream in nominal format as a function of the first stream and the second stream.

17 Claims, 2 Drawing Sheets

U.S. PATENT DOCUMENTS

| | | | |
|---|---|---|---|
| 6,064,748 A * | 5/2000 | Hogan | 382/100 |
| 6,415,031 B1 * | 7/2002 | Colligan et al. | 380/200 |
| 6,573,819 B1 * | 6/2003 | Oshima et al. | 386/111 |
| 6,938,166 B1 * | 8/2005 | Sarfati et al. | 382/116 |
| 7,317,868 B2 * | 1/2008 | Oshima et al. | 386/111 |
| 7,382,969 B2 * | 6/2008 | Dawson | 386/94 |
| 7,428,755 B2 * | 9/2008 | Lecomte | 726/26 |
| 2002/0037160 A1 * | 3/2002 | Locket et al. | 386/111 |
| 2002/0138736 A1 * | 9/2002 | Morin | 713/180 |
| 2005/0039212 A1 * | 2/2005 | Baran et al. | 725/91 |
| 2008/0063385 A1 * | 3/2008 | Oshima et al. | 386/125 |
| 2008/0063386 A1 * | 3/2008 | Oshima et al. | 386/125 |
| 2009/0204864 A1 * | 8/2009 | Ohta et al. | 714/748 |

FOREIGN PATENT DOCUMENTS

| | | |
|---|---|---|
| EP | 0 975 165 A2 | 1/2000 |
| EP | 1 011 269 A1 | 6/2000 |
| WO | WO 00/60846 A2 | 10/2000 |

* cited by examiner

SECURE DEVICE FOR THE BROADCASTING, RECORDING AND VIEWING ON DEMAND OF AUDIOVISUAL WORKS IN A FORMAT OF THE MPEG-2 TS TYPE

RELATED APPLICATION

This is a §371 of International Application No. PCT/FR2004/050046, with an international filing date of Feb. 5, 2004 (WO 2004/073292, published Aug. 26, 2004), which is based on French Patent Application No. 03/01494, filed Feb. 7, 2003.

FIELD OF THE INVENTION

This invention relates to the processing, broadcasting, recording and secure viewing of audiovisual data and television programs, or, more generally, any program or multimedia sequence using a nominal stream format of the MPEG type by authorized users and provides a secure system for the processing, broadcasting delivery, recording, private copy and viewing of programs and of interactive video or multimedia sequences.

BACKGROUND

The general problem is to furnish a device capable of transmitting in a secure manner a set of high-quality visual films or programs in a format of the MPEG-2 TS (Transport Stream) type directly to a TV screen and/or for being recorded on the hard disk of a box connecting the telecommunication network to the television screen while preserving the audiovisual quality yet avoiding any fraudulent use such as the possibility of making pirated copies of films or audiovisual programs recorded on the hard disk of the decoder box.

It is possible with current solutions to transmit films and audiovisual programs in digital form via broadcasting networks of the microwave, cable, satellite, etc. type or via telecommunication networks of the DSL (Digital Subscriber Line) type or BLR (local radio loop) type or via DAB (Digital Audio Broadcasting) networks. Furthermore, to avoid the pirating of works broadcasted in this manner, they are frequently encrypted by various well known means.

WO 00/60846 proposes a solution for the distribution of video on demand via a system of distributed servers. The protection of the content of the digital video is based on an encryption system based on digital keys. The chief innovation of that disclosure is an encryption and decryption of MPEG-TS streams simplified in that an analysis of the MPEG is carried out beforehand to optimize the encryption as a function of the structure of the stream. The calculating time is in fact sharply reduced due to a selective and optimal encryption of the MPEG-TS stream. Analysis of the stream consists primarily of marking the TS packets containing information essential for a correct decoding of the video in the MPEG sense in such a manner that in a second encryption only the useful data of the marked TS packets are encrypted. Thus, the essential information is unavailable for an unauthorized decoding and the stream can therefore not be displayed, while retaining a reasonable calculating time for the encryption. However, that solution does not permit a resolution of the security problem because the protection of the video stream is based on an encryption system based on digital keys but for which the video stream transmitted to receiver equipment contains in encrypted form all the information initially present in the original video stream. Therefore, the video stream received by the client equipment already contains all the information initially present in the non-encrypted video stream even if they are stored in a form that does not permit their being used. An ill-intentioned user can process the encrypted video stream in such a manner as to put it back in a form that can be used by a classic video decoder and can therefore circumvent the protection system because a direct and correct reconstitution of the audiovisual stream from only the encrypted stream is possible.

A solution to this problem would consist of making the reconstitution of the original video stream from only the protected video stream impossible. Moreover, the modified packets can be detected in such a manner as to be recognized by the decryption module. However, making the encrypted TS packets readily detectable facilitates all the more the task of ill-intentioned individuals who might desire to circumvent this protection. A solution to this problem would consist of not permitting the detection of scrambled packets via a simple analysis of the stream. Therefore, the prior art does not satisfy the technical problem and the criteria for high security constituting subject, matter of the present invention.

To prevent access to a compressed digital copy of a video program, another solution consists of adding the protection to the video when it is still in analog form prior to digital compression. Thus, to remove the associated protection it is necessary to process the video stream after the MPEG decoding since it was in this form that the protection was introduced, which implies that only a decompressed version of the non-protected stream is accessible. Now, an initial, non-compressed version of a video stream is difficult to exploit. In this connection, the general solution disclosed by EP 1 011 269 A1 is of the same type as that of WO 00/60846 in that it is also based on an encryption based on digital keys. However, that solution is insufficient because the reconstituted video is not perfectly identical to the original video.

Another solution consists of preventing the possibility of viewing or making a non-compressed digital copy of the stream by conditioning the use of the video stream on the obtention of protection information from distributing equipment. In this connection, the solution disclosed by EP 0 975 165 A2 (is known that is similar to that of WO 00/60846 in that it makes use of an encryption based on digital keys. However, that solution is insufficient for remedying the technical problem of security because the information sent from the distributing equipment to the addressed equipment for the use of the video stream is information connected to the limited reproduction rights of the video stream. Thus, the video stream received by the client equipment also contains all the information initially presented in the non-protected video stream.

SUMMARY OF THE INVENTION

This invention relates to a process for distributing audiovisual sequences in accordance with a nominal stream format respecting a MPEG-2 TS norm including a succession of TS packets, including analyzing the stream made prior to transmitting to client equipment to generate a first stream in conformity with the MPEG-2 TS format, modifying all or part of the TS packets by substituting packets of the same structure, but whose content was modified, generating a second stream of a format comprising digital information suitable to permit reconstruction of the nominal stream, separately transmitting the two streams from a server to the equipment, and calculating a synthesis of a stream in nominal format as a function of the first stream and the second stream on the equipment.

This invention also relates to equipment for fabricating a video stream, including at least one multimedia server containing original video sequences and a device for analyzing the video stream coming from the server for generating the two streams.

This invention further relates to equipment for exploiting a video stream, including a standard reader of MPEG-2 TS streams, at least one recording interface for storing the content of the first stream and at least one display interface, and means for recomposition of the original stream from the two streams.

This invention still further relates to a system for transmitting a video stream including equipment for the production of a video stream including at least one multimedia server containing original video sequences and a device for analyzing the video stream coming from the server for generating the two streams, at least one piece of equipment for exploiting a video stream including a standard reader of MPEG-2 TS streams, at least one recording interface for storing the content of the first stream and at least one display interface, means for recomposition of the original stream from the two streams, and at least one communication network between the production equipment and the piece or pieces of exploitation equipment.

BRIEF DESCRIPTION OF THE DRAWINGS

This invention will be better understood from a reading of the following description of a non-limiting exemplary embodiment that makes reference to the attached drawings.

DETAILED DESCRIPTION

The invention relates in its most general meaning to a process for the distribution of audio-visual sequences in accordance with a nominal stream format respecting the MPEG-2 TS norm, composed by a succession of TS packets, characterized in that an analysis of the stream is made prior to the transmission to the client equipment to generate a first stream in conformity with the MPEG-2 TS format, modified in that all or part of the TS packets constituting it were/was substituted by packets of the same structure but whose content was modified, and to generate a second stream of a format comprising the digital information suitable for permitting the reconstruction of the nominal stream, then to separately transmit the two generated streams from the server to the addressed equipment, and that a calculation is made on the addressed equipment of a synthesis of a stream in nominal format as a function of the first stream and of the second stream.

The substituted TS packets preferably contain information relative to one or several video streams included in the TS stream. The substituted TS packets preferably contain information relative to one or several audio streams included in the TS stream.

This analysis of the stream advantageously comprises a stage for the determination of the TS packets to be substituted as a function of their video content.

It is advantageous if only certain parts of the content of the substituted packets are actually modified.

According to one aspect, the second stream contains the substituted TS packets stemming from the nominal stream.

According to a particular aspect, the second stream contains the data necessary for effecting the substitutions of bytes to be applied in this first stream to obtain this nominal stream.

According to another aspect, the first stream is modified by the modification of the values of all or of part of the indicator fields of the start of the useful load.

According to another aspect, the second stream respects the MPEG-2 TS format. According to a particular aspect, the first stream has the same size in bytes as the original stream in MPEG-2 TS format.

The first stream and the second stream are preferably transmitted to the addressed equipment via the same communication network. The second stream is advantageously encrypted. The second stream is advantageously multiplexed within the first stream.

The invention also relates to equipment for the fabrication of a video stream for implementing the process, comprising at least one multimedia server containing the original video sequences and characterized in that it comprises a device for analyzing the video stream coming from the server for generating the two streams.

The invention also relates to equipment for the exploitation of a video stream for implementing the process, comprising a standard reader of MPEG-2 TS streams, at least one recording interface (hard disk) for storing the content of the first stream and at least one display interface, characterized in that it comprises means for the recomposition of the original stream from the two streams.

Finally, the invention concerns a system for transmitting a video stream, comprising equipment for the production of a video stream, at least one piece of equipment for exploiting a video stream and at least one communication network between the production equipment and the piece or pieces of exploitation equipment.

The invention relates to an audiovisual stream in the MPEG-2 TS format containing at least one packetized, elementary video stream. The format of the packetized video stream used must have the following characteristics:

The format must decompose the data into frames with each frame comprising at least one complete digital I (Intra) picture/;

Each I picture decomposes into macroblocks with a given size, which macroblocks themselves decompose into blocks of a given size;

Each I picture contains coefficients for the correlation between the different blocks and/or macroblocks of the I pictures.

In the following description, the example concerns an MPEG-2 TS stream containing a video MPEG-2 stream without this constituting a limitation on the scope of the protection. However, the invention also applies in the same manner to multimedia MPEG-4 streams, directly in the TS format or multiplexed in an MPEG-2 TS stream.

The general principle of a process for securing an audiovisual stream is disclosed below. The objective is to authorize the on-demand and à-la-carte video services via all the broadcasting networks and the local recording in the digital decoder box of the user. The solution comprises permanently retaining part of the recorded audiovisual program outside of the user's dwelling and in fact in the broadcasting and transmitting network, which part is of primary importance for viewing this audiovisual program on a television screen or a screen of the monitor type but which has a very small volume relative to the total volume of the digital audiovisual program recorded at the user's location. The lacking part will be transmitted via the broadcasting network (transmission) at the moment of the viewing of this digital audiovisual program pre-recorded at the user's location.

Thus, the greatest part of the audiovisual stream, called "first stream," will be transmitted via a classic broadcasting network, whereas the lacking part, called "second stream" will be sent on demand via a narrow-band telecommunication network such as the classic telephone networks or cellular networks of the GSM, GPRS or UMTS types or by using a small part of a network of the DSL or BLR (local radio loop) type, or also by using a subset of the bandwidth divided on a cable network.

Figure 1:
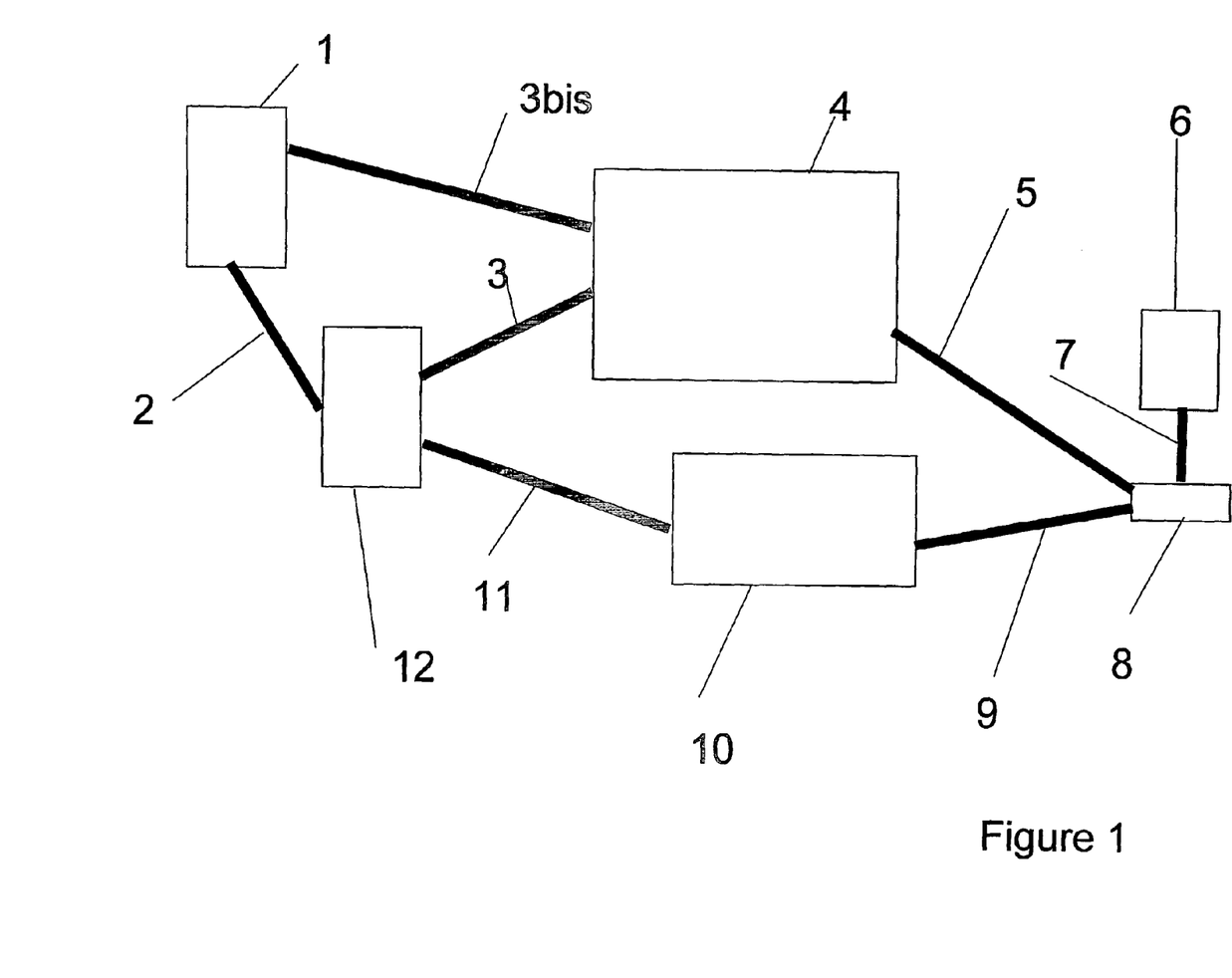
FIG. 1 describes the total architecture of the system for implementing the process of the invention.

In the attached drawings, FIG. 1 shows a block diagram of a distribution system in accordance with the present invention.

Figure 2:
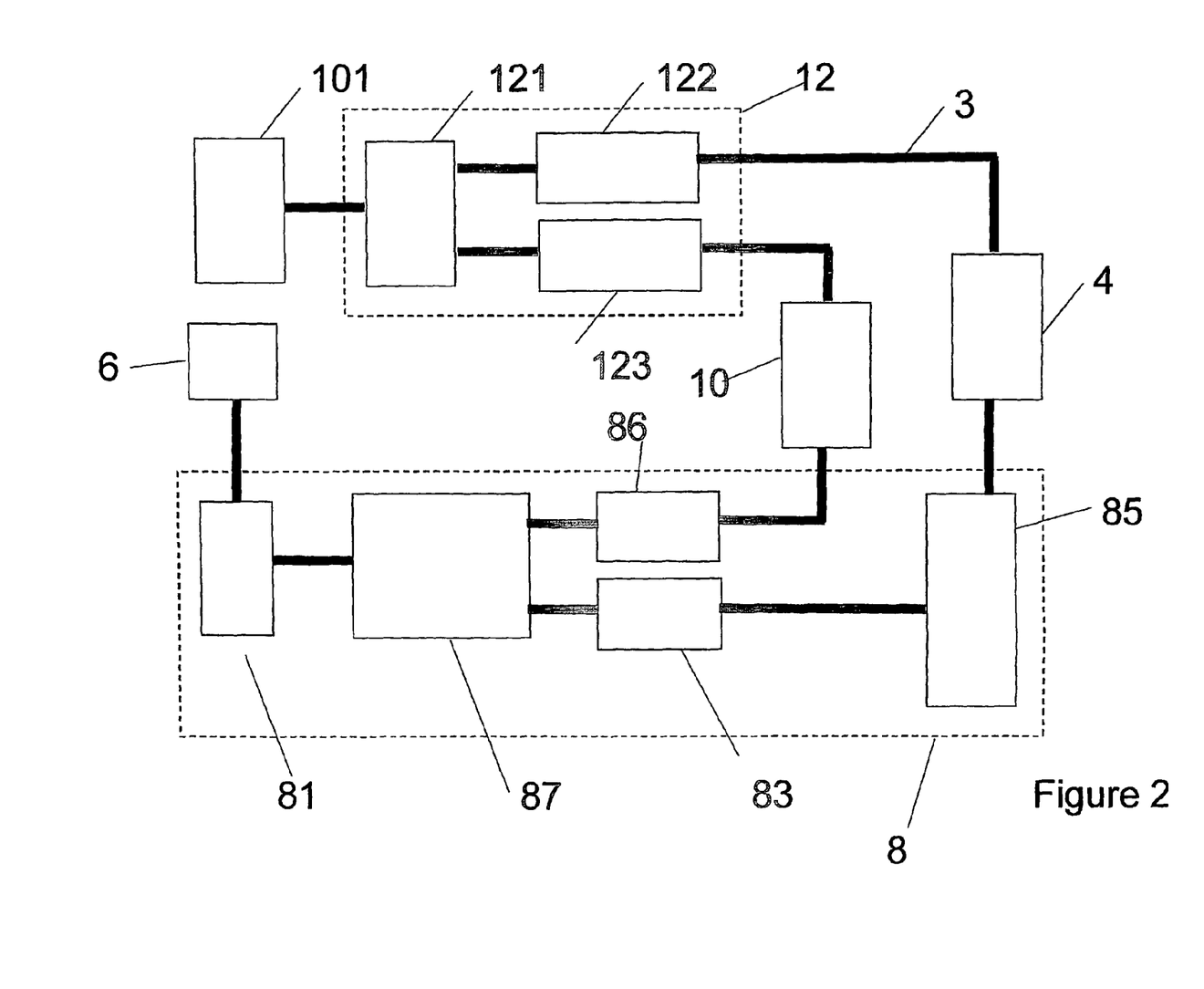
FIG. 2 represents a particular embodiment of the system for the analysis and synthesis of streams of the MPEG type in conformity with the invention.

FIG. 2 represents a particular embodiment of the system for the analysis, protection and reconstitution of streams in accordance with the invention.

In FIG. 1, the video interface arrangement 8 is adapted to connect at least one display device, e.g., a monitor, a video projector or a device of the television screen type 6 to at least one broadband transmission and broadcasting network interface 4 and to at least one telecommunication network interface 10. According to the invention this arrangement is composed of a module 8 primarily comprising on the one hand a processing unit adapted to process and in particular reconstitute the original stream and decode any video stream of the MPEG type in accordance with a pre-loaded decoding and deconstituting software program in such a manner as to display it in real or differed time, store it, record it and/or send it on a telecommunication network and comprising, on the other hand, at least one screen 7 interface and an interface for connection to a local or extended network 5 and/or 9. Transmission and broadband broadcasting network 4 and telecommunication network 10 can be combined into one network.

The hard disk of the module 8 can be used as buffer memory for temporarily storing at least one part of the program or of the video sequence to be displayed in case of deferred viewing or of a limitation in the broadband of the transmission network. The viewing can be delayed or deferred upon the request of the user or of portal 12.

As FIG. 1 shows, connection interface 5 is connected to a broadband transmission and broadcasting network 4 such as a modem, satellite modem, cable modem, fiber-optic line interface or a radio or infrared interface for wireless communication.

The content of audiovisual programs such as films will be transmitted via this classic connection for video broadcasting. However, in order not to allow pirated copies to be made, a small part of the audiovisual content is retained in portal 12 before transmitting the audiovisual content from server 1 or portal 12.

In the case of viewing an audiovisual program in real time, this small part of the audiovisual content retained in portal 12 will also be sent to module 8 via telecommunication network 10.

As the successive pictures of a video sequence comprise a large number of identical visual elements, MPEG records only the elements that differentiate the successive pictures. Thus, by modifying only an entire reference I picture and retaining the digital information suitable for permitting its reconstitution in portal 12, the successive pictures that depend on this reference I picture are also affected by the degradation, and it is not necessary to add modifications to them since they will make the viewed stream diverge on account of disturbances added to the reference I pictures. The object of the system part of MPEG-2 is to permit the combining of one or several elementary streams of video and audio data as well as of other types to form isolated or multiple streams suitable for recording or transmission. The TS sub-part of the system part of the MPEG-2 norm describes a data stream format that permits the broadcasting of audiovisual programs on networks exposed to transmission errors such as, e.g., cable or satellite. The streams in conformity with the TS (Transport Stream) part of MPEG-2, the transport streams, are called "MPEG-2 TS streams" in the following. The operation comprising forming an MPEG-2 TS stream from one or several elementary streams is called "multiplexing" and the inverse operation of extracting elementary streams from within an MPEG-2 TS stream is called "demultiplexing." Each MPEG-2 TS stream is composed of a succession of 188 byte packets. The size of these packets (otherwise called TS packets) is fixed. Each packet contains a header permitting in particular the identification of its useful load (or payload) as well as other digital data. The useful load of the TS packets is utilized to transport the data to be broadcast such as, e.g., the elementary audio and video stream. The elementary streams multiplexed in an MPEG-2 TS stream are previously packetized in such a manner as to form packetized elementary streams (or PES). These PES especially contain packets in the headers, which packets form them, and information permitting the synchronization of the video and audio streams that compose an audiovisual program. The packets forming a PES are of variable sizes. Certain TS packets contain data permitting the association of elementary streams in such a manner as to generate an audiovisual program such as, e.g., associating a video track with the appropriate audio track or tracks. By way of simplification, a packetized elementary video stream is regularly called a "video stream" herein. The invention is also applied in the same manner to an audio stream corresponding to a packetized audio stream.

The invention comprises substituting certain TS packets of the nominal stream by packets of the same structure and allowing the stream obtained, the first stream, to remain in conformity with the MPEG-2 norm, but of which the contents were modified in such a manner as to alter the display. This substitution is carried out in two stages:

Identification of the video TS packets to be modified;
Analysis and modification of the content of the TS packets to be modified.

The identification of the content of the TS packets comprises selecting the packets carrying video information within the MPEG-2 TS stream. This operation is similar to an operation of demultiplexing MPEG-2 TS streams that is well known.

The second stage consists comprises analyzing and modifying the MPEG-2 video stream in the TS packets of the nominal stream in the MPEG-2 TS format.

A digital video stream of the MPEG-2 type is constituted of sequences of pictures (or plans or frames) grouped in groups of pictures (GOP's). A picture can be of the I (Intra), P (Predicted), B (Bidirectional) type. The I pictures are reference pictures and entirely coded and are therefore of an elevated size and do not contain information about the movement. The P plans are plans predicted from preceding plans whether they are I and/or P by vectors of movement in a single direction called "forward." The B plans are called "bidirectional" and connected to the I and/or P plans preceding or following them by vectors of movement in the two directions in time (forward and backward). The movement vectors represent two-dimensional vectors used for the compensation of movements that procure the difference of coordinates between a part of the current picture and a part of the reference picture. A picture is organized by slices comprising macroblocks, constituted themselves of blocks containing elements describing the content of the video stream, e.g., the DC coefficients stemming from a frequency transformation and relative to the fundamental, that is, to the average value of the coefficients of a block, or the AC coefficients relative to the higher frequencies. The modification made to the video stream comprise using the correlations between the DC coefficients in an I picture and the correlations between the I, B and P pictures to be able to manipulate the aspect and the visual validity of the sequence to which the I picture in question belongs.

In fact, given that the I pictures are the main carriers of information in a video MPEG sequence, every significant modification affecting these I pictures will necessarily have an impact on the validity of the sequence.

Thus, the possibility of obtaining significant degradations of the I pictures without carrying out complicated manipulations is offered by the correlation between the DC coefficients in this I picture. These coefficients, which are heavily dependent on each other because they are differentially coded, determined to a large part the value of the coefficients of the same nature that follow. Thus, by modifying the information contained in them, the I pictures are profoundly modified and as a consequence the entire MPEG sequence following this I picture.

Each macroblock of an I picture contain six blocks, each of which begins with a DC coefficient. Four blocks correspond to the luminance (Y) and two to the chrominance (Cb and Cr) of the macroblock. The value written in a file of the MPEG stream representing a DC coefficient is in fact the difference between the true value of this coefficient and that of the preceding corresponding coefficient and which, for the Y blocks, can be located in the same macroblock or in the preceding macroblock, whereas for the Cb and Cr blocks it is always located in the preceding macroblock. A modification of one of these differences automatically brings about a modification of information in all the following macroblocks.

This method is optimal for the visual degradation of the video MPEG stream using the DC coefficients of the blocks but it can also be applied to the AC coefficients. It is also possible to envision modifying some of these AC coefficients in a random manner.

Furthermore, the B and P pictures of the MPEG stream also contain AC and DC coefficients and are also processed by the invention.

The modification of the AC and DC coefficients described above is performed on the video content of the TS packets to be substituted. However, substituting one of these coefficients by a coefficient of the same nature, but random does not guarantee that the resulting MPEG-2 TS stream still respects the norm: The size of the AC and DC coefficients inserted must be the same as the size of the initial coefficients. In the contrary case, the multiplexing of the various streams composing the nominal MPEG-2 TS stream risks no longer being correct. Moreover, changing the size of the coefficients could modify the binary rate of the MPEG-2 TS stream, which can pose great problems during its broadcasting on classic networks of the satellite or cable type. This is why the random coefficients inserted must have exactly the same binary size as the original coefficients. In the following we will explain how to make modifications of DC and AC coefficients without changing the size of the binary words on which they are coded. It is, however, perfectly possible to modify another binary field of the video stream in a complementary fashion in such a manner as to further degrade the display of the modified video program, which modifications retain the stream in con-formity with the norm.

The DC coefficients are coded on two binary fields in MPEG-2: A field "dct_dc_size" designated "size", and a field "dct_dc_differential" designated "differential". The first field "size" permits the indication of the number of bits on which the value "differential" is coded. Thus, substituting a DC coefficient by a random coefficient is possible while leaving the "size" field unchanged, and replacing the "differential" field by a random binary word with the length "size".

The AC coefficients are coded in the form of a list of couples (run, level). A nm is the number of zero AC coefficients preceding an AC coefficient with the value "level". Thus, the series of the AC coefficients 0, 0, 1, 0, 0, 0, 5 is written in the form (2, 1), (3, 5). Moreover, these couples (one, level) are written into the binary stream using a coding technique with variable length: The couples occurring most frequently are coded on a number of bits that is lower than the couples more rarely encountered. The couples for which no variable-length code was provided (because their frequency of appearance is too low) are written into the stream with the aid of an escape code. This latter technique comprises writing a predefined binary word into the stream indicating to the decoder that the run and the level that it is in the process of reading are coded in a separate and independent manner on binary words with a fixed length (6 bits for the run and 12 for the level signed) just after the escape code. There are in general several couples (run, level) possible for a given binary length. Thus, the binary words 0100 and 0101 correspond to two different couples (run, level). Replacing AC coefficients of an MPEG-2 video stream by random values thus comprises selecting an authorized binary word of the same size as the binary word to be modified and writing it in its place. The MPEG-2 norm defines two possible tables of correspondence between run, level couples and binary words (table B-14 and B-15 of the video MPEG-2 norm). To find a couple with the same size as the couple to be substituted, it is therefore sufficient to go through the adapted table and find an appropriate couple. This is not always possible for the shortest binary words, in which case it is necessary to leave the couple unchanged. In the case in which the couple (run, level) is written with the aid of an escape code, the binary words corresponding to the run and the level are replaced with random values on the same number of bits.

The modifications made to the elementary video stream are only made within certain TS packets selected as a function of their characteristics and of their content. Several exemplary embodiment are described in the following.

In a first exemplary embodiment, the MPEG-2 TS stream is analyzed in such a manner as to be able to identify and process the binary words corresponding to the DC and AC coefficients contained in the TS packets. One or several video streams are processed. The remainder of the document describes the process used to process a video stream. In this exemplary embodiment all the DC and AC coefficients identified are modified in the manner described above. The process retains in memory an original copy of the TS packet that it is processing. When the system has finished processing a given TS packet it decides either to take the original TS packet (non-modified) again and to write it into the output stream (otherwise called first stream), or to write the packet that it just obtained by modification of the original packet. This first stream obtained thus possesses TS packets whose contents were entirely modified and TS packets whose content is unchanged.

If several video streams are processed simultaneously, the processing to be performed is the same for each video stream and the various processes are performed in an independent manner.

The choice of the modified TC packets to be written at the output of the analysis and modification module is a function of the quantity of modifications to be made to the stream. It is also a function of the video content processed. Thus, a modification made to a long binary word is more degrading visually than a modification made to a short binary word because in the case of a long binary word the number of available binary words of the same size is greater. Thus, there is a greater chance that the inserted value is very far from the original value for a long word than for a short word. During the decision to write or not to write the TS packet at the output, the system tests the average length of the coefficients that were modified within the packet, and if it is greater than a threshold, it writes the modified TS packet at the output. Otherwise, it is the original non-modified TS packet that it writes at the output of the analysis and modification system.

In a variation of this exemplary embodiment only the TS packets containing the information relative to the I pictures of the video stream are processed and written in the first stream.

In another variation of this exemplary embodiment, the TS packets containing the information relative to the I and P or B pictures of the video stream are processed and written in this first stream.

In yet another variation of this exemplary embodiment, only the TS packets containing the information relative to the starts of the slices making up the I pictures of the video stream are processed and written in this first stream.

In still another exemplary embodiment, the AC and DC coefficients are not all modified in the video stream processed. The analysis and modification system makes use of an "interrupter" for controlling modification or substitution. When the system begins to process a given TS packet it decides to modify it or not modify it in a random manner. If it decides to modify it, it places its interrupter on the "modification" position; in this instance all the following AC and DC coefficients are modified until the interrupter re-passes the position "recopy". The system passes the "recopy" position when it begins the processing of a TS packet that it does not wish to modify.

In a variation of this exemplary embodiment, in addition to the modifications made to the video data contained in the TS packets, the process also modifies the values of all or part of the indicator fields of the start of the useful load of the video stream processed, which indicator is called "payload_unit_start_indicator" in the MPEG-2 norm. The "payload_unit_start_indicator" field is a binary field of 1 bit present in the header of each TS packet, used to indicate the presence of a header PES in the useful load of the packet.

In another exemplary embodiment, the modifications made to the audiovisual stream concern all or part of the audio streams included in the original stream. The modifications made to the audio stream are of the same type as those described for the video, but adapted to the specificities of the audio digital formats, e.g.: Substitution of spectral coefficients or factors of scale by random values.

In all the exemplary embodiments, the original TS packets, corresponding to modified packets in the modified first stream, are retained in a second stream of any format in portal 12 and are not transmitted to module 8.

In another exemplary embodiment, only certain parts of the content of the substituted packets are actually modified. For example, only 5 DC coefficients are modified in a TS packet and the other elements of the packet remain unchanged.

The second stream advantageously contains only the data necessary for detecting the substitutions of bytes to be applied to the first stream to obtain the nominal stream. The second stream therefore contains the original positions and the values of the modified bytes. This avoids having to retransmit the entire original TS packet in the instance in which the modifications are not very numerous for the packet concerned.

When it reads the binary sequence, a classic MPEG decoder identifiers the start of a coded picture, then the type of picture. To avoid any confusion between a standard decoder box often called "Set Top Box or STB", the standard MPEG decoder is hereafter designated "reader" (player or viewer). The reader can be realized in a physical manner (or hardware) and/or in a computer manner (software). The MPEG reader successively decodes each macroblock of the picture. The picture is reconstructed when all its macroblocks have been processed. If an I picture is concerned, it constitutes a reference picture for the subsequent pictures and is stored in place of the oldest reference picture. The pictures are therefore available in digital form for post-processing and display as the application desires.

Certain TS packets of the audiovisual stream are therefore retained in portal 12. On the other hand, instead of and in place of non-transmitted TS packets the device in conformity with the invention intercalates false TS packets of the same nature and size as the packets removed and retained in portal 12 in such a manner that the standard MPEG reader of module 8 is not disturbed by these modifications which it will ignore and it will reconstitute an output MPEG stream at the output that will be incorrect from the visual standpoint for a human being but correct from the standpoint of the MPEG format.

The MPEG reader of decoder box 8 is a standard MPEG reader and is not modified in any manner or affected by the changes made in the MPEG stream.

As can be seen in FIG. 1, connection interface 9 is connected to extended telecommunication network 10 directly or via a local network serving as access network and is constituted, e.g., by a subscriber line interface (analog or digital telephone network, DSL, BLR, GSM, GPRS, UMTS, etc.).

Thus, the audiovisual programs are broadcast in a classic manner in multi-broadcasting mode via broadband transmission network 4 of the microwave, cable, satellite, digital microwave, DSL, etc. type from server 1 directly via connection 3bis or via portal 12 via connections 2, 3 to decoder module 8 via connection 5. Each audiovisual program broadcast in this manner can be encrypted or not encrypted and, in conformity with the invention, the streams of the MPEG type comprise TS packets substituted by packets whose content was modified as described above. Certain audiovisual programs modified in this manner and incomplete are recorded on the hard disk of box 8 as a function of the parameters selected by the user or of information transmitted by the broadcasting server.

When the user desires to view an audiovisual program recorded in this manner on the hard disk of box 8, the user requests this in a known manner with a remote control connected to his box 8 that then connects automatically to gate 12 via connection 9 of the local network and or direct access type and via telecommunication network 10 connected itself to portal 12 via connection 11. During the entire viewing of the audiovisual program, connections 9 and 11 remain established and allow box 8 to receive the functions and parameters for putting back in order and restoring the modified TS packets as well as the original TS packets retained in portal 12. The TS packets transmitted in this manner are never recorded on the hard disk of box 8 because the video stream reconstituted by the synthesis module is displayed directly on viewing screen 6 via connection 7 after having been processed by the reader of box 8 from its volatile local memory. Once processed and visualized, the original TS packets just transmitted by portal 12 are deleted from the volatile local memory of box 8.

Each time that the user wishes to view a program recorded on the hard disk of box 8, box 8 connects automatically to portal 12. The reconstitution of the original MPEG stream in video interface arrangement 8 is without loss.

Likewise, when the user pauses, the transmission of the second stream containing the original TS packets coming from portal 12 will be interrupted until the viewing is resumed, thus guaranteeing that all the information of an audiovisual program will not be in box 8 at a given moment and thus preventing an ill-intentioned person from making pirated copies of these recordings.

The second stream is advantageously encrypted prior to its transmission to decoder box 8 in accordance with a standard encryption technique.

In a particular embodiment, the second stream containing the information permitting the reconstitution and visualization of the audiovisual program by the user is structured in such a manner that it respects the MPEG-2 TS norm.

In a particular embodiment, communication networks 4 and 10 are merged.

In a variation of this particular embodiment in which the second stream is structured in accordance with the MPEG-2 TS format, the second stream is multiplexed with the MPEG-2 TS stream containing the first stream. For example, the second stream is declared as "private user" data within the program containing the first stream, as is provided by the MPEG-2 norm.

The second stream is advantageously encrypted.

Although the invention is more particularly centered on the video streams included in the MPEG-2 TS streams, it is understood that all interactive multimedia information and all multiplexed interactive data in an MPEG-2 TS stream can be processed by the arrangement in the system and that the video data of the MPEG type is preferred. The invention will be better understood from the following description presenting the physical base of the invention and by referring to FIG. 2 of the attached drawings representing a preferred embodiment of the latter by way of a non-limiting example that is particularly well adapted for cable and satellite networks.

The complete MPEG-2 TS stream 101 is analyzed by analysis device 121 of portal 12 and will therefore be separated into a stream of the MPEG-2 TS, the first stream, but of which certain TS packets will have been substituted and which will be sent via output 121 of the portal to broadband transmission and broadcasting network 4.

The other part of the modified MPEG stream, the second stream, will be memorized in buffer memory 123 of portal 12. Portal 12 will retain for each MPEG stream broadcast in this manner in buffer memory 123 the modifications that will have been made to the MPEG-2 TS stream by analyzer 121 of portal 12 as well as the original TS packets. It is specified that the treatment of the stream can be different for each user 8 and/or for each group of users 8 for one and the same MPEG-2 TS input stream 101. Therefore, buffer memory 123 of portal 12 comprises a different memory zone for each user.

In the following implemented example, only the video TS packets containing the start of a slice of an I picture whose content is relative to an I picture are modified.

The different stages for a user will now be described.

Portal 121 selected the MPEG-2 TS stream 101 that it is to send to user 8 for being viewed on his television screen 6. This user is connected to digital broadcasting cable network 4 and to ADSL telecommunication network 10.

Analysis system 121 of portal 12 will therefore read the entering MPEG-2 TS stream 101 and, each time that it detects a TS packet to be modified, it analyzes its content. This analysis permits it to recognize the DC and AC coefficients in the code and substitute them by random values without changing their size in the TS packet to render the pictures (and consequently the sequence) not acceptable from the standpoint of human visual perception. The real TS packets will be stored in output buffer 123 that will subsequently permit the reconstitution of the start sequence in box 8 following the inverse scheme.

Analysis and modification system 121 then enters the true TS packet in buffer 123. Analysis system 121 continues its analysis until the end of the MPEG input stream.

Then, the new modified MPEG stream is recorded in output buffer 122 to be broadcast on broadcasting network 4 via connection 3. The substituted TS packets of entering MPEG-2 TS stream 101 are memorized in buffer 123 of portal 12.

The modified output MPEG-2 TS stream coming from output buffer 122 of portal 12 is broadcast during this time and in a totally non-synchronized manner via broadband network 4 to one or several users 8 and stored on hard disk 85.

The phase described above corresponds to the first preparation phase of the MPEG-2 TS stream by portal 12, its transmission via broadband network 4 and its recording in decoder 8. The decoder can then display the MPEG-2 TS stream recorded on its hard disk 85. To this end, synthesis system 87 of decoder 8 will read the MPEG-2 TS file from its hard disk 85 and send it to classic MPEG-2 TS reader 81. If no complementary data is received by synthesis system 87, then the MPEG-2 TS stream arriving at reader 81 is treated and displayed as it is, which causes a significant distortion of the display on viewing screen 6. In fact, the modified TS packets that are processed by synthesis system 87 do not correspond to the TS packets that are necessary for a correct viewing since certain DC and AC coefficients have been substituted by random coefficients. On the other hand, since the recorded stream is a stream of the MPEG-2 TS, reader 81 does not make any distinction and displays the information on output screen 6 that appear as data of an MPEG-2 TS video stream, but are totally incoherent for a human eye viewing screen 6. Every copy of the MPEG-2 TS stream coming from hard disk 85 of box 8 will produce the same visual effect during its restitution by any MPEG reader. When the user of decoder 8 actually desires to view the audiovisual program recorded on hard disk 85 on screen 6, the user requests this from synthesis system 87 with a remote control as with a video cassette recorder or a DVD reader having a menu on a television screen. Synthesis system 87 then makes a request to hard disk 85 and begins to analyze the modified MPEG-2 TS stream coming from hard disk 85 via reading buffer 83. Synthesis system 87 then establishes a connection with portal 12 via telecommunication network 10 that is a DSL connection in the example. Once this connection is established and during the entire duration of the viewing of the film or of the audiovisual program, synthesis system 87 retrieves the original TS packets and digital information corresponding to the stream recorded on hard disk 85 from buffer memory 123 of server 12. The data arrives at synthesis system 87 via input buffer memory 86 and is stored temporarily in synthesis system 87. Synthesis system 87 reconstitutes the original MPEG-2 TS stream in a manner that is the inverse of the analysis process previously described from the modified MPEG-2 TS stream arriving via buffer 8 and from the original TS packets and the associated data arriving from buffer 86 and sends the new MPEG-2 TS stream reconstituted in this manner to reader 81 for being displayed correctly on screen 6.

The original TS packets coming from portal 12 via the second stream and the associated data are advantageously deleted from synthesis system 87 during their usage.

It is advantageous if portal 12 has verified that the user of box 8 was authorized to receive the second stream before portal 12 sends the original TS packets and associated data from its buffer 123.

The invention claimed is:

1. A process for distributing audiovisual sequences in accordance with a nominal stream format respecting a MPEG-2 TS norm comprising a succession of TS packets, comprising:
   analyzing the stream made prior to transmitting to client equipment to generate a first stream in conformity with the MPEG-2 TS format,
   modifying all or part of the TS packets by substituting modified packets of the same structure and size whose content is of primary importance for viewing,
   generating a second stream of a format comprising digital information suitable to permit reconstruction of the nominal stream,
   separately transmitting the two streams from a server to the client equipment, and
   calculating a synthesis of a stream in nominal format as a function of the first stream and the second stream on the client equipment.

2. The process according to claim 1, wherein the substituted TS packets contain information relative to one or several video streams included in the TS stream.

3. The process according to claim 1, wherein the substituted TS packets contain information relative to one or several audio streams included in the TS stream.

4. The process according to claim 1, wherein analyzing the stream comprises a stage for determination of the TS packets to be substituted as a function of their content.

5. The process according to claim 1, wherein only certain parts of content of the substituted packets are actually modified.

6. The process according to claim 1, wherein the second stream contains the substituted TS packets stemming from the nominal stream.

7. The process according to claim 1, wherein the second stream contains data necessary for effecting substitutions of bytes to be applied in the first stream to obtain the nominal stream.

8. The process according to claim 1, wherein the first stream is modified by modification of values of all or part of indicator fields.

9. The process according to claim 1, wherein the second stream respects the MPEG-2 TS format.

10. The process according to claim 1, wherein the first stream has the same size in bytes as the original stream in MPEG-2 TS format.

11. The process according to claim 1, wherein the first stream and the second stream are transmitted to the equipment via the same communication network.

12. The process according to claim 1, wherein the second stream in encrypted.

13. The process according to claim 11, wherein the second stream is multiplexed in the first stream.

14. The process according to claim 12, wherein the second stream is multiplexed in the first stream.

15. Equipment that fabricates a video stream according to claim 1, comprising at least one multimedia server containing original video sequences and a device for analyzing the video stream coming from the server for generating the two streams.

16. Equipment that exploits a video stream according to claim 1, comprising a standard reader of MPEG-2 TS streams, at least one recording interface for storing the content of the first stream and at least one display interface, and means for recomposition of the original stream from the two streams.

17. A system that transmits a video stream according to claim 1 comprising equipment that produces the video stream comprising at least one multimedia server containing original video sequences and a device for analyzing the video stream coming from the server for generating the two streams, at least one piece of equipment for exploiting a video stream comprising a standard reader of MPEG-2 TS streams, at least one recording interface for storing the content of the first stream and at least one display interface, means for recomposition of the original stream from the two streams, and at least one communication network between the production equipment and the piece or pieces of exploitation equipment.

* * * * *